United States Patent Office 3,449,308
Patented June 10, 1969

3,449,308
FLAME-RESISTANT HYDROCARBON POLYMERS
Philip Strubing Blatz, Wilmington, Del., assignor to E. I.
du Pont de Nemours and Company, Wilmington, Del.,
a corporation of Delaware
No Drawing. Continuation-in-part of application Ser. No.
439,961, Mar. 15, 1965. This application Jan. 18, 1966,
Ser. No. 521,428
Int. Cl. C08f 27/08; C09k 3/28
U.S. Cl. 260—88.1                                6 Claims

ABSTRACT OF THE DISCLOSURE

Olefinic hydrocarbon polymers are made flame resistant by reacting selected phosphorous compounds e.g., those having the general formula

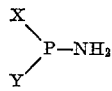

with the aforesaid olefin polymers to produce the linkage —C—N—P with the carbon atom of the linkage attached to the olefin polymer by an uninterrupted carbon to carbon linkage.

---

This invention relates to flame-resistant polymers which are substantially hydrocarbon in nature. This application is a continuation-in-part of application Ser. No. 439,961, filed Mar. 15, 1965 and now abandoned, which is a continuation-in-part of Ser. No. 167,934, filed Jan. 22, 1962, now abandoned.

The present invention is realized by chemically bonding phosphorus to a substantially olefinic hydrocarbon polymer so as to produce the structure —C—N—P with the carbon atom of the structure being bonded to the polymer by a carbon-carbon linkage in the main chain or in a side chain so long as the attachment is through an uninterrupted sequence of carbon-carbon bonds.

The —C—N—P linkage may be introduced by postreacting with a substantially hydrocarbon copolymer prepared, usually by free-radical techniques, from a mono-α-olefinic hydrocarbon having the structure $CH_2=CHR_y$, wherein $R_y$ is selected from the group consisting of hydrogen and alkyl and alkaryl radicals having 1 to 16 carbon atoms, and a monoethylenically unsaturated comonomer selected from the group consisting of alkenoic and alkenedioic acids, alkenetricarboxylic acids and methylene alkanedioic acids having 3 to 18 carbon atoms, and alkenyl amides having 2 to 20 carbon atoms. The alkenyl amides have the formula

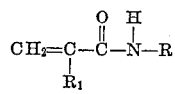

wherein R and $R_1$ are selected from the class consisting of hydrogen and alkyl groups having 1 to 4 carbon atoms. Examples of these monoethylenically unsaturated comonomers are acrylic acid, methacrylic acid, fumaric acid, maleic acid, itaconic acid, aconitic acid, acrylamide, methacrylamide, N-methyl acrylamide, N-methyl methacrylamide and the like. The preferred comonomers are acrylamide, methacrylamide, acrylic acid and methacrylic acid. Reduction products of the copolymer prepared from the above-described alkenyl amides are also operable. These reduction products may be prepared by known methods, e.g., by reacting the copolymer with lithium aluminum hydride or hydrogen with a palladium on carbon catalyst. In the substantially hydrocarbon copolymers, the amount of bound comonomer is limited to the range 0.2 to 13 mole percent. To minimize the deleterious effects which the comonomers exert on some properties, especially molecular weight, the comonomer concentration most often is limited to a maximum of 4 mole percent.

Prior to introduction of the —C—N—P linkage into the copolymer described above, the acid groups of the copolymer are converted to the corresponding acid halide by conventional methods. The resulting acid halide copolymer is then reacted with a compound having the general formulae

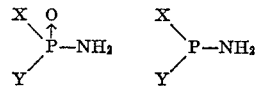

wherein X is selected from the class consisting of hydrogen, R, OR, NHR

and $NH_2$ and Y is selected from the class consisting of R, OR, NHR, and

wherein R is an alkyl, aryl or aralkyl group having 1 to 18 carbon atoms, to produce the —C—N—P linkage.
Examples of such phosphorus amides are

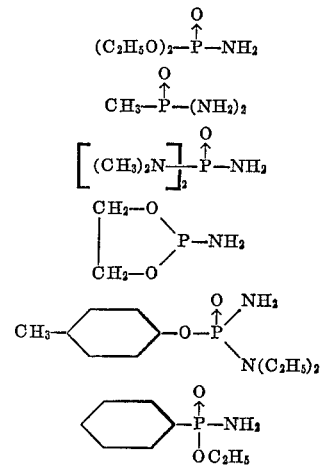

If the comonomer is an alkenyl amide, or the amide copolymer is reduced to the amine copolymer, the —C—N—P linkage is introduced by reacting the copolymer with a compound having the formula

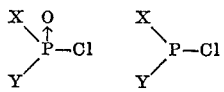

wherein X is selected from the group consisting of hydrogen, R, OR, NHR and

and Y is selected from the group consisting of chlorine, R, OR, NHR and

wherein R is defined as above. Examples of these phosphorus halides are

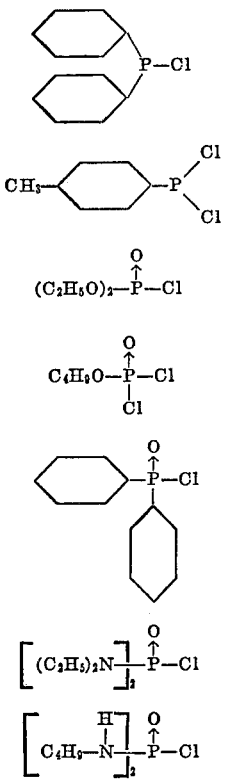

Regardless of the method of introducing the flameproofing agent, the substantially olefinic hydrocarbon polymer usually may have bound thereto up to 4 mole percent phosphorus, although as little as about 0.1 mole percent sometimes will suffice. The flame-resistant product should contain at least one phosphorus atom per 1000 carbon atoms of the substantially hydrocarbon polymer. The bound phosphorus usually does not exceed 5 mole percent, and preferably 2.5 mole percent of the polymer to be made flameproof so as to minimize alteration of its base properties. In addition, the phosphorus should be uniformly dispersed throughout the polymer so that the maximum flame-resistance may be obtained.

The flame-resistant products prepared by the aforementioned techniques may be dissolved and reprecipitated, or, alternately, may be extracted or fractionated using appropriate polymer solvents and nonsolvents in order to ensure that the phosphorus is chemically bonded to the polymer rather than physically intermixed therewith.

Although only a post-reaction technique is described hereinabove and in the following examples, it should be apparent to one skilled in the art that the —C—N—P linkage may be inserted in a substantially olefin polymer by copolymerization or by postpolymerization employing comonomers or polymers already containing the linkage.

EXAMPLE 1

Approximately 30 grams of an ethyleneacrylamide copolymer (melt index=10) containing 10% acrylamide was banded on a 2″ diameter rubber mill at 125° C. until a melt was obtained following which 3 grams (36% of stoichiometric based on amide) of benzene phosphinic dichloride was added to the melt. The temperature of the mill was raised to 180° C. and the composition milled for 10 minutes. The polymer was then sheeted off the mill. A compression molded bar of the resulting polymer was self-extinguishing according to ASTM D–635–56T and an infrared analysis of a thin film of the polymer indicated the presence of —C—N—P linkage. The polymer contained approximately 1.5% phosphorus.

EXAMPLE 2

Approximately 15 grams of an ethylenemethacrylyl chloride copolymer was dissolved in 900 g. of water-free toluene at 72° C. in an enclosed glass vessel. After the addition of 75 g. of dry pyridine, 17 grams (340% stoichiometric) of diethyl phosphoramidate was added. The mixture was stirred and heated to 110° C. for 48 hours. After introducing sufficient dry gaseous ammonia to react with any unreacted acid chloride remaining, the polymer was precipitated in 3 liters of acetone, and the polymer isolated. A compression molded bar of the polymer was self-extinguishing when tested according to ASTM D–635–56T. An infrared analysis of a thin film of the polymer indicated the presence of the —C—N—P linkage.

The flame-resistant compositions prepared by means of this invention are useful in any application employing similar but nonflame-resistant resins. These applications include uses as shaped structures such as a film, fiber, tubing, wire coating, rod stock and a cellular or foamed structure. For example, a flame-resistant extrudate from the orifice of a melt indexer, while still molten, is drawn into a fiber having good flexibility and toughness. When a suitable mandrel is positioned at the orifice of the melt indexer, the extrudate is shaped into tubing or pipe, also, having good flexibility and toughness. A sample of a flame-resistant resin as prepared herein is compression molded between platens for one minute at 180° C. and 30,000 p.s.i. to give a transparent film which is useful as a wrapping or protective cover. A similar sample which contains 0.75% of an azodicarbonamide blowing agent is extruded through a melt indexer at 200° C. to yield a compressible cellular structure having utility as a packaging cushion. When a 0.025-inch copper wire is drawn through a molten sample of a flame-resistant resin as prepared herein, it is provided with a protective insulation which adheres to the wire despite extended flexing. Still another sample is injection molded from a conventional injection molding machine at 230° C. into the cavity of a cool mold to produce a flame-resistant, molded, shaped-structure.

I claim:

1. A flame-resistant composition comprising a high molecular weight, normally solid, substantially olefinic hydrocarbon copolymer, said copolymer containing at least 87 mole percent bound mono-α-olefinic hydrocarbon and a bound monoethylenically unsaturated comonomer having pendent functional groups capable of being reduced to an acid halide or amide and having the group —C—N—P substantially uniformly dispersed therethrough with the carbon atom of said —C—N—P group being chemically bonded to the main chain of said polymer through an uninterrupted carbon-carbon linkage at the site of said functional group, said composition having from one P atom per 1000 carbon atoms to 4 mole percent of P atoms based upon the monomer units in said copolymer.

2. The composition of claim 1 wherein the maximum amount of the bound P atom is 2.5 mole percent based upon the monomer units in said substantially olefinic hydrocarbon polymer.

3. The composition of claim 2 wherein said substantially olefinic hydrocarbon polymer is ethylene and methacrylic acid.

4. The composition of claim 1 in the form of a shaped structure.

5. The composition of claim 3 wherein the shaped structure is selected from the group consisting of a film, tube, fiber, rod and an expanded cellular structure.

6. A flame-resistant composition comprising a high molecular weight, normally solid, substantially olefinic hydrocarbon copolymer containing (a) at least 87 mole percent bound mono-α-olefinic hydrocarbon having the structure $CH_2=CHR_2$, wherein $R_2$ is selected from the group consisting of hydrogen and alkyl radicals having 1 to 18 carbon atoms, and (b) a bound monoethylenically unsaturated comonomer selected from the group consisting of alkenoic acids, alkenedioic acids, alkenetricarboxylic acids, and methylene alkanedioic acids, each of said acids having 3 to 18 carbon atoms and alkenyl amides having 2 to 20 carbon atoms and combinations thereof, said flame-resistant composition containing the group —C—N—P, substantially uniformly dispersed therethrough, with the carbon atom of said group being chemically bonded to the main chain of said substantially hydrocarbon copolymer through an uninterrupted carbon-carbon linkage at the site of said functional groups of said monoethylenically unsaturated comonomer, said flame-resistant composition having a content of from one P atom per 1000 carbon atoms to 15 weight percent of said substantially hydrocarbon copolymer.

References Cited
UNITED STATES PATENTS 3,267,113    8/1966    Carboni _____ 260—88.1

JOSEPH L. SCHOFER, *Primary Examiner.*

M. B. KURTZMAN, *Assistant Examiner.*

U.S. Cl. X.R.

260—45.9, 78.5